United States Patent [19]

Seniuk

[11] 3,791,695
[45] Feb. 12, 1974

[54] VEHICLE HOIST MECHANISM
[76] Inventor: Stephen Peter Seniuk, 5 Chester St., Winnipeg, Manitoba, Canada
[22] Filed: Jan. 7, 1972
[21] Appl. No.: 216,044

[52] U.S. Cl. ............................................... 298/22 J
[51] Int. Cl. ............................................... B60p 1/20
[58] Field of Search ....... 298/22 J, 17.6, 17.7, 22 B, 298/22 D, 22 A

[56] References Cited
UNITED STATES PATENTS
2,144,599  1/1939  Anthony ........................... 298/22 B
2,488,790  11/1949  Wood ................................ 298/22 B
2,836,460  5/1958  Lundell ............................. 298/22 J FOREIGN PATENTS OR APPLICATIONS
722,518  11/1965  Canada ............................. 298/22 J

*Primary Examiner*—Richard J. Johnson
*Assistant Examiner*—Reinhard J. Eisenzopf

[57] ABSTRACT

A dump truck hoist mechanism of the "scissors" type has L-shaped members, depending end portions of which project down below the plane of the upper surfaces of the vehicle chassis in order to achieve a combination of (*a*) a comparatively wide spacing between the axis about which the two members of the mechanism are interconnected and the location at which hydraulic cylinders act on the upper member to rotate it about such axis, with resulting good leverage, and (*b*) a lower than normal "mounting height" between the vehicle and dump box chassises. A lost motion mechanism is incorporated into the pivotal connection between the dump box chassis and the upper member to facilitate the linkage.

9 Claims, 15 Drawing Figures

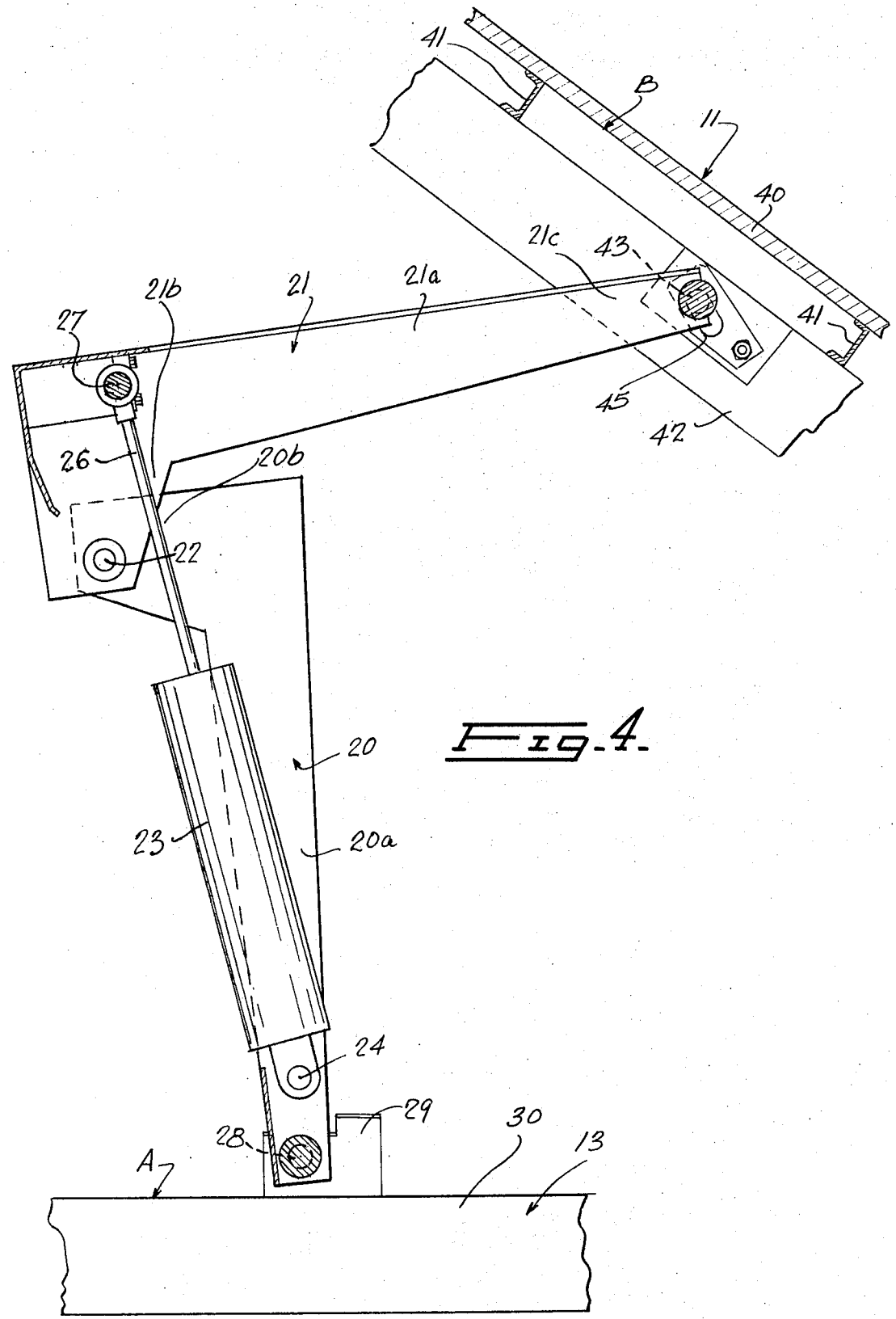

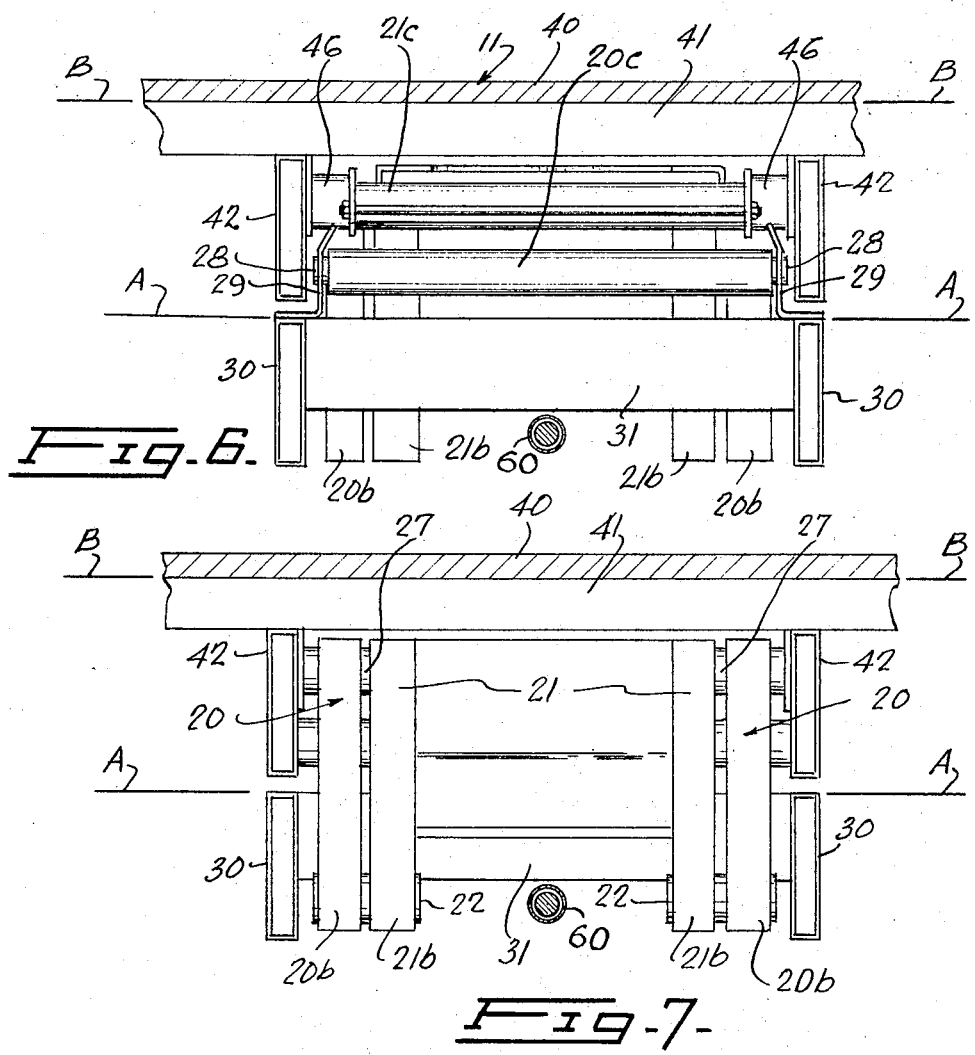

3,791,695

VEHICLE HOIST MECHANISM

This invention relates to a hoist mechanism for use with dump trucks or like vehicles in which a so-called "box," tray or other platform is pivotally mounted on the vehicle chassis at one location, while at another location it can be elevated by the hoist mechanism, so as to incline the box to dump out its contents. This pivotable part of the vehicle will be referred to hereinafter as the "dump box chassis" or simply "box chassis." However, it is to be understood that this part may take the form of a simple platform with or without upstanding end or side walls.

More specifically, the present invention is concerned with improvements in the so-called "lever" or "scissors" type of hoist mechanism for such vehicles.

The principal object of the present invention is to provide improvements in the construction of such a hoist mechanism and more particularly a reduction in its required mounting height. The hoist mechanism has to be mounted in the confined space between the chassises, and its "mounting height" is defined as the distance between the top surface of the vehicle chassis and the bottom of the floor of the dump box chassis. It will be apparent that the lower the mounting height the better the stability of the assembly, because the centre of gravity of the entire vehicle, whether loaded or not, will be lower, with less likelihood of overturning on rough terrain.

In vehicles fitted with conventional hoists of the scissors type, the mounting height has typically been of the order of 12 inches or more. Hoists of the telescopic type have also required a minimum mounting height of about 10 to 12 inches, and the cam and roller type of hoist is even less favourable in this regard, often requiring a mounting height as high as 14 inches.

By means of the construction of the present invention, it has proved possible to achieve a hoist mechanism having a mounting height as low as 8 or even 7 inches. Moreover this reduction in the mounting height has been achieved without sacrifice of other features, such as the lifting force developed.

The manner in which this advantage is achieved is illustrated by means of several embodiments of the invention that are illustrated in the accompanying drawings. Such illustration is provided by way of example only, and not by way of limitation of the broad scope of the invention, which latter is defined in the appended claims.

In the drawings:

FIG. 4 is a view similar to FIG. 3 showing the mechanism in raised position;

FIG. 6 is a section on the line VI—VI in FIG. 3;

FIG. 7 is a section on the line VII—VII in FIG. 3;

FIG. 8 is a section on the line VIII—VIII in FIG. 5;

Figure 1:
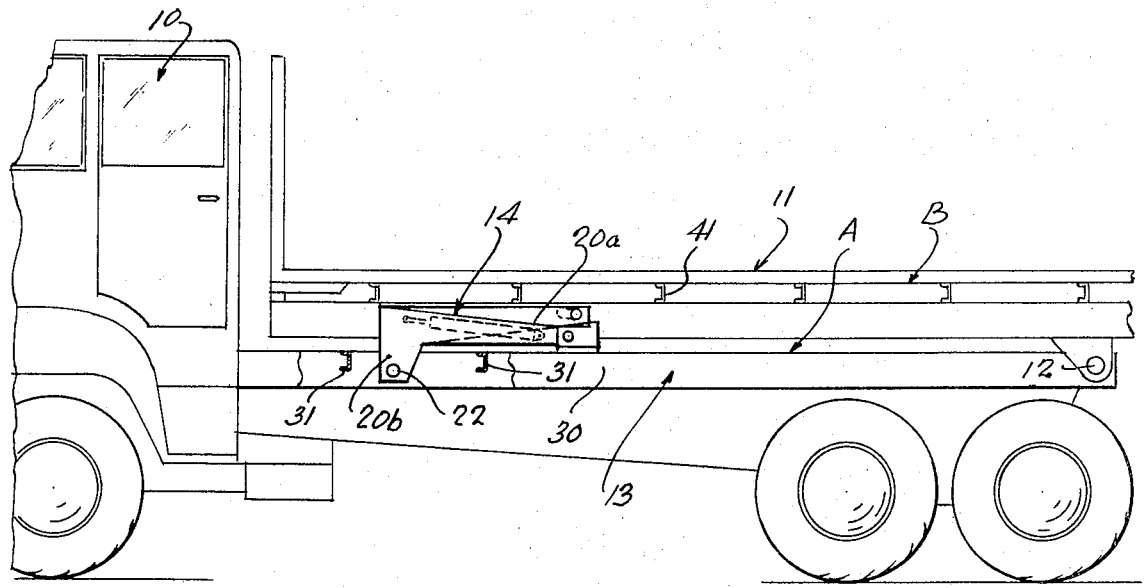
FIG. 1 is a side view of a dump truck cut away to show a hoist mechanism on a relatively small scale and in its lowered position.
Figure 2:
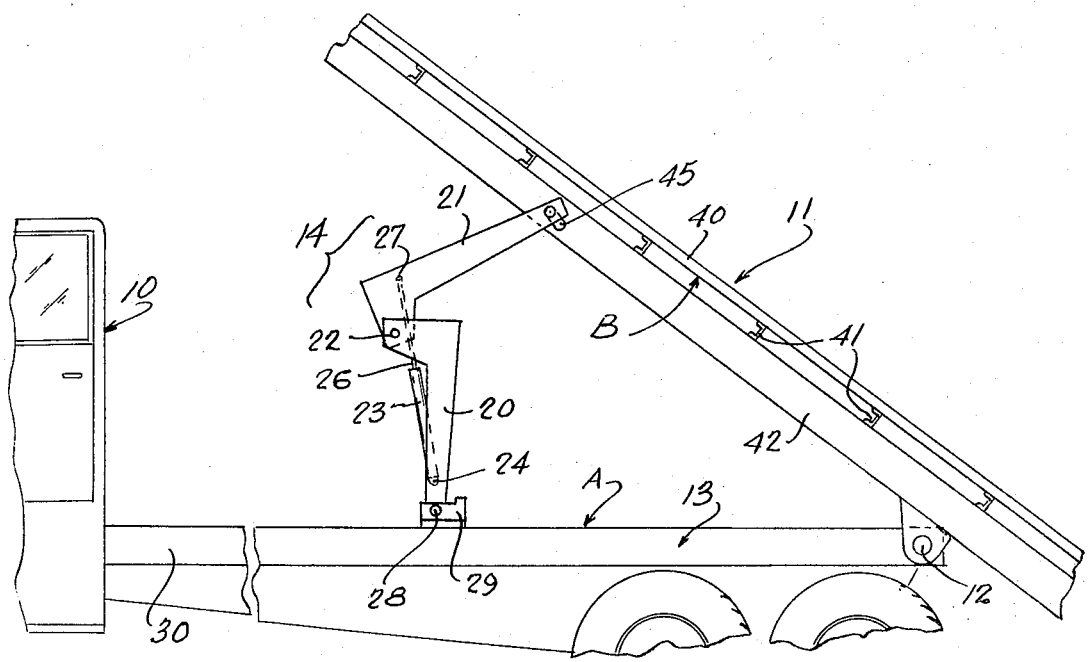
FIG. 2 is a view similar to FIG. 1 in the raised position.
Figure 3:
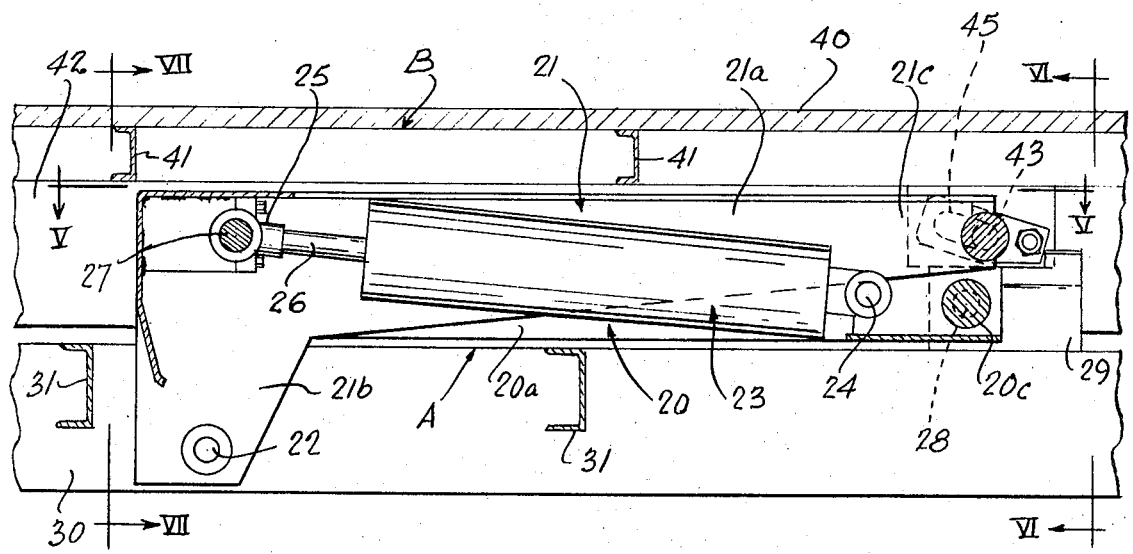
FIG. 3 is an enlarged, vertical, central section of the hoist mechanism in lowered position, taken on the line III—III in FIG. 5.
Figure 5:
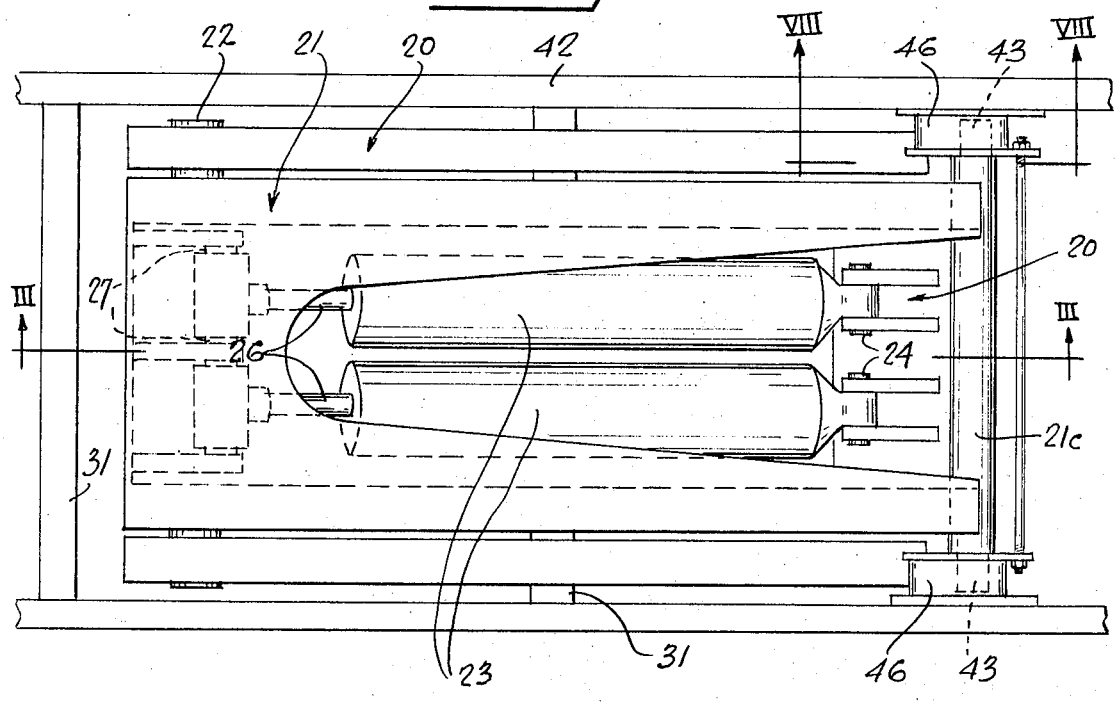
FIG. 5 is a plan view of the mechanism in its lowered position, taken on the line V—V in FIG. 3.

FIGS. 1 and 2 illustrate a truck 10 having a dump box chassis 11 pivotally mounted by pins 12 in the conventional manner to the truck chassis 13. A hoist mechanism 14 is connected between the vehicle and box chassises in the manner that will now be described with reference to FIGS. 1 to 7.

The hoist mechanism 14 comprises a lower member 20 connected to the vehicle chassis 13 and an upper member 21 connected to the box chassis 11, these upper and lower members being pivotally interconnected by pins 22 so as to be movable between lowered and raised positions by hydraulic cylinders 23 that are pivotally mounted on the lower member 20 by pins 24 and that have pistons 26 pivotally connected to the upper member 21 by pins 27.

The lower member 20 is pivotally mounted on the vehicle chassis 13 by means of pins 28 engaging brackets 29 that are secured to main longitudinal members 30 of the chassis. The top surfaces of the members 30 define an upper vehicle chassis plane A (FIGS. 6 and 7) above which the mounting height is measured.

Both the upper and lower hoist members 20 and 21 are L-shaped, consisting of main portions 20a and 21a that lie at all times above the top chassis plane A, and depending end portions 20b and 21b which project down below the plane A into the space between the chassis members 30. This L-shaping of the hoist members is an important aspect of the construction from the viewpoint of minimizing the mounting height. The mounting height is the distance between the plane A and a plane B defined by the undersurface of the floor 40 of the box chassis 11. The L-shape construction of the hoist members also allows the distance between the pivotal axes defined by the pins 22 and 27 respectively to be comparatively large. The greater this distance between the axes, the greater the upward force exerted during operation, other factors being equal. On the other hand, the end portions 20b and 21b are able to project downwardly below the plane A and between the members 30, when the mechanism is in its lowered position, without interfering with the cross sills 31 that extend at intervals transversely between the longitudinal members 30 for ensuring the rigidity of the chassis, and without interfering with any other equipment that it may be convenient to locate in the space between the longitudinal members 30. The spaced apart nature of the downwardly projecting end portions 20b and 21b also enables them to straddle the drive shaft 60 (shown diagrammatically in FIGS. 6 and 7 only). The L-shape of the members 20 and 21 thus avoids any need to modify the vehicle chassis structure or the mounting of auxiliary equipment thereon.

The upper member 21 is connected to the box chassis 11 through lost motion mechanisms that will now be described. Secured to the underside of the floor 40 of the box chassis 11 there are a series of spaced cross sills 41 to which in turn longitudinal members 42 are secured. This is conventional construction. It is to the longitudinal members 42 that the free end 21c of the upper member 21 is connected through the lost motion mechanisms. This free end 21c consists mainly of a transverse member (see FIG. 5) from the ends of which cylindrical projections 43 extend. These projections 43 are free to rotate in the member 21c and thus constitute rollers. These rollers 43 engage in slots 45 formed in housings 46 secured to respective longitudinal members 42. In the lowered position of the hoist, the rollers 43 occupy the rearward ends of the slots 45, as shown in FIGS. 1, 3, 5 and 8; while in the elevated position, these rollers occupy the forward ends of the slots 45, as shown in FIGS. 2 and 4, for reasons that will now be described in connection with the diagrams of FIGS. 9 to 12.

Figure 9:
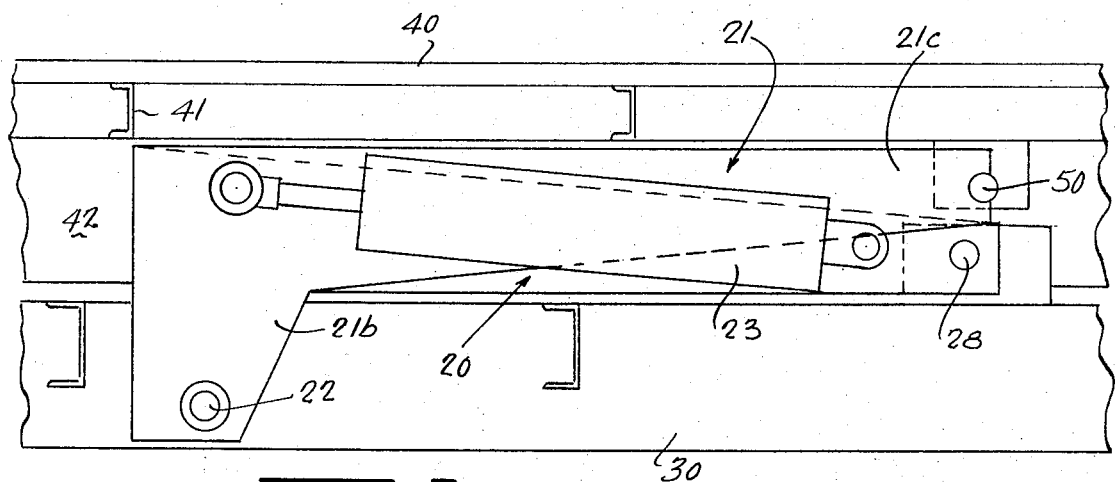
FIG. 9 is a side view of a hoist mechanism constructed without one of the essential features of the present invention.
Figure 10:
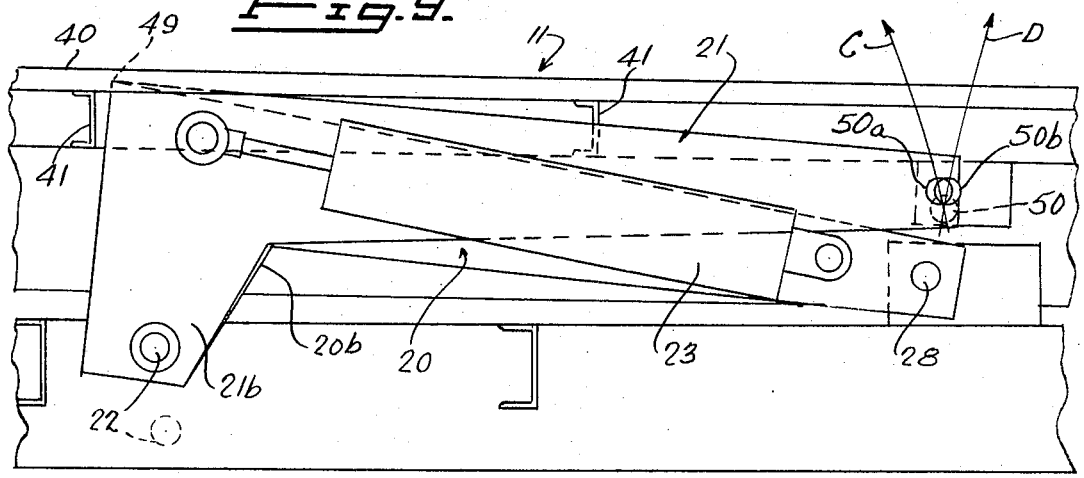
FIG. 10 is a view of the parts of FIG. 9 at a different stage of operation, demonstrating the unsatisfactory mode of operation that it would have.

By way of preliminary explanation, FIG. 9 has been arranged to show the conditions that would exist, if the lost motion mechanisms (rollers 43 and slots 45) were omitted. FIG. 9 shows the parts in lowered position and it has been assumed that the free end 21c of the upper member 21 is connected to the longitudinal members 42 of the dump box chassis by simple pivot pins 50 having no provision for lost motion. FIG. 10 demonstrates the effect of this arrangement when the cylinders 23 are actuated to extend their pistons 26 and start to move the mechanism towards its raised position. The initial effect of this expansion of the cylinders is to rotate the upper member 21 anticlockwise about the pivot pins 22. This motion would, if no other factors were involved, move the pins 50 in an arc C described about the axis of the pins 22 to the position shown at 50a. However, these pins cannot move to the position 50a, because they are also attached to the dump box chassis 11 which during upward movement rotates about the pins 12 in an arc D, thus forcing the pins 50 to try to occupy the position 50b. In other words, the box chassis 11 effectively pulls the upper member 21 rearwardly by a distance equal to the distance between position 50a and 50b. These considerations have been shown in FIG. 10 with some of the dimensions slightly exaggerated in order to make the point clear.

This rearward pulling of the upper member 21 causes bodily rotation of the entire hoist mechanism in a clockwise sense about the pins 28 with a substantial elevation of the entire forward end of the hoist mechanism. At least, this is what would happen, if it were not for the fact that the hoist members will interfere with the dump box. This interference has been illustrated diagrammatically in FIG. 10 by showing in broken lines the upper free (left hand) corner 49 of the hoist mechanism penetrating the floor 40 of the box. In fact the mechanism would also interfere with one or more of the sills 41, unless these were cut away in the area immediately above the hoist mechanism. In practice, of course, such penetration cannot be allowed to take place, even if the forces are great enough to cause it. Assuming that they are not, what will happen is that either the mechanism will be severely strained or it will bind and the box will not be elevated. In other words, the linkage is an impossible one for operation in the space available.

Some amelioration of this difficulty can be achieved by increasing the height of the transverse sills 41, in other words by increasing the mounting height, but this would be contrary to the object of the present invention. Moreover, should any of the sills 41 be located directly above the hoist mechanism, these would have to be omitted or reduced in size, which would have a general weakening effect on the rigidity of the dump box chassis and would consequently also be undesirable.

Figure 11:
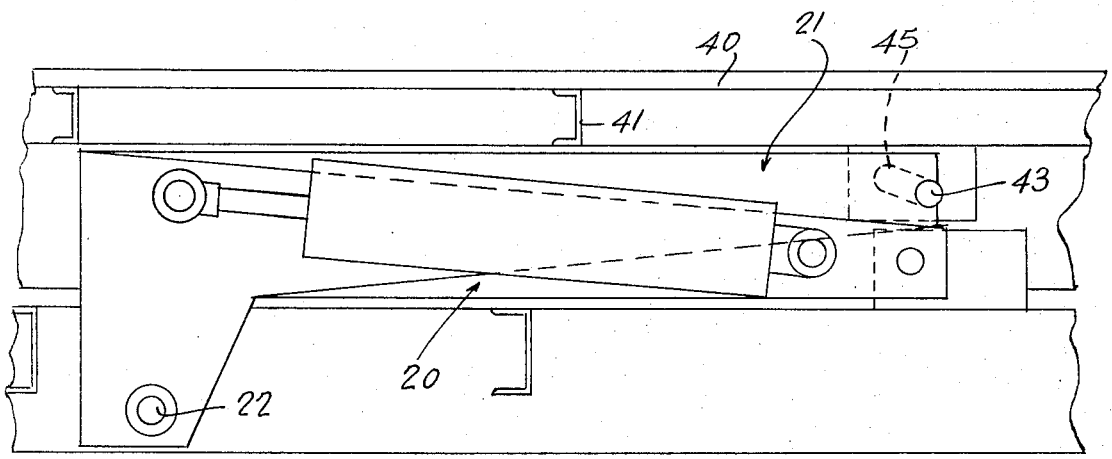
FIG. 11 is a view similar to FIG. 9 but of a mechanism incorporating said essential feature of the present invention.
Figure 12:
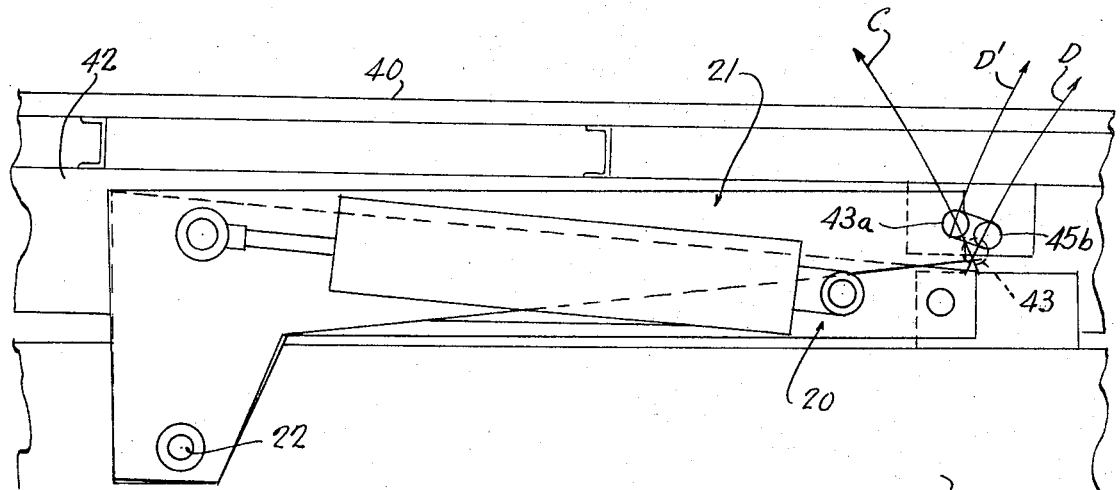
FIG. 12 is a view similar to FIG. 10 demonstrating the manner in which the mechanism of FIG. 11 avoids the difficulty illustrated in FIG. 10.

According to the invention, this difficulty is overcome by providing the lost motion mechanisms, one form of which (the rollers 43 and slots 45) is illustrated in FIGS. 1 to 8 and demonstrated geometrically in FIGS. 11 and 12. FIG. 11 corresponds to FIG. 9, except that the pins 50 have been replaced by the rollers 43 and slots 45. When the mechanism begins to be expanded, as shown in FIG. 12, each roller 43 is permitted to move in the arc C to position 43a while its slot 45 moves in the arc D to position 45b, until the roller 45 reaches the forward end of the slot. During this time, there is no tendency for the upper member 21 to be pulled rearwardly and hence both hoist members remain in their lowermost positions, except for the rotation of the upper member 21 about the pins 22. By the time the rollers 43 have reached the forward ends of the slots 45 the box has risen sufficiently to provide the necessary clearance of the box chassis from the mechanism, so that no disadvantage results from the fact that during subsequent upward movement the rollers 43 are caused to travel in the arc D'. Again, no attempt has been made to make FIG. 12 dimensionally accurate, but merely to demonstrate the principle involved.

It might at first sight appear that the difficulty inherent in the linkage of FIGS. 9 and 10 could be overcome by reversing the orientation of the mechanism on the vehicle, i.e. by placing the mounting pins 28 forward (more remote from the pins 12) and arranging the members 20, 21 to extend rearwardly towards the pins 12. This orientation would have the effect of giving the arcs C and D a curvature in the same sense, i.e. both upwards and towards the rear. Nevertheless they would still not be coincident with each other, since they are described about different axes (the axes of the pins 22 and 12 respectively), and thus some horizontal travel or "lost motion" would still be required. Moreover, the portion of the dump box chassis immediately overlying the upper free corner 49 would then be nearer to the pins 12 than in the orientation illustrated, with the result that such portion would rise less for a given angular elevation of the dump box chassis and would therefore require the mechanism to reach a more expanded condition before the elevation of the dump box chassis became sufficient to avoid any further difficulty of interference between the upper free corner 49 of the mechanism and such overlying portion.

It will be noted from FIG. 8 that the upper surface 48 of each slot 45 is inclined to the horizontal. This is to avoid another factor that would otherwise tend to force the forward end of the mechanism upwardly. As the mechanism begins to elevate the box chassis, the weight of the box and its contents bears down on each roller 43 through the surface 48. This force is applied normal to the surface 48, i.e. in the direction of the arrow E in FIG. 8. It will be noted that the line of action of the force E passes to the left (forwardly) of the axis defined by the pins 28. As a result, the effect of this force is to try to rotate the hoist mechanism bodily in a counterclockwise direction about the pins 28; in other words, to hold the forward ends 20b and 21b of the two members firmly downward in their lowermost positions. If the slots 45 had been formed with horizontal bearing surfaces 48, this downward force E would have acted rearwardly of the axis of the pins 28, which would have produced a clockwise moment on the whole assembly tending to force up the left hand ends 20b and 21b against the underside of the box. While in this case the linkage would not be an impossible one, the forces that would exist could be damaging.

Figure 13:
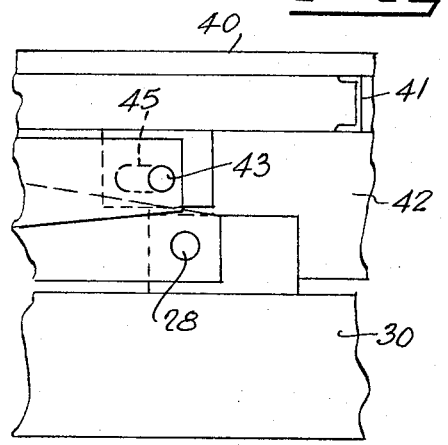
FIGS. 13 to 15 are side views illustrating fragments of various alternative embodiments of the invention.

In the event that the axis of the rollers 43 is located forwardly of the axis of the pins 28, as shown in the alternative construction of FIG. 13, there no longer remains any need to incline the slots 45 upwardly and forwardly and they can conveniently be arranged to extend truly horizontally.

Figure 14:
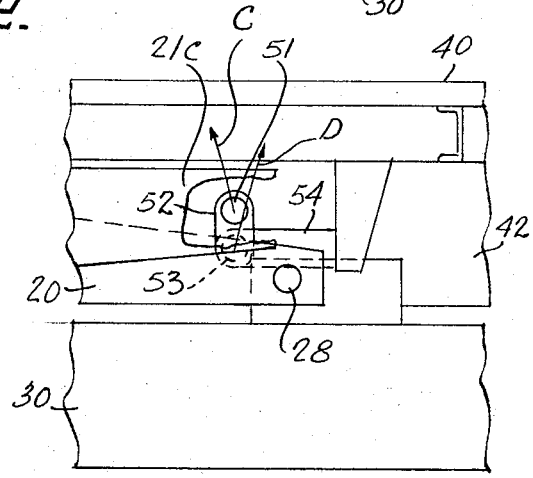
Figure 15:
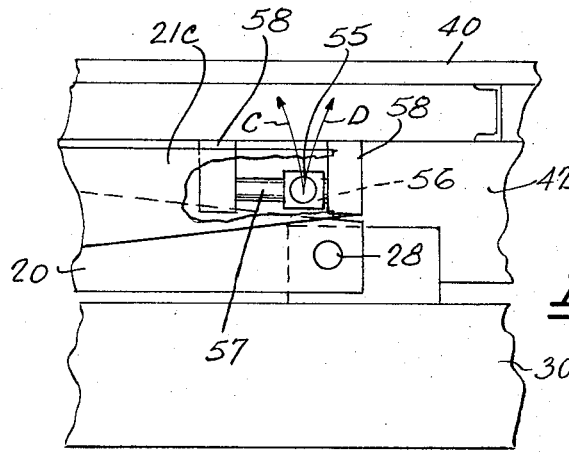

FIGS. 14 and 15 show further alternative constructions of lost motion mechanisms. In FIG. 14, each transverse end of the free end 21c of the member 21 is pivotally connected by a pin 51 to one end of a link 52, the other end of which is pivotally connected by a pin 53 to a fixed bracket 54 secured to the underside of the box chassis 11. During initial operation of this arrangement, the pins 51 are free to travel in the arc C, while the pins 53 can travel in the arc D, the links 52 rotating counterclockwise during this time. The limit of this rotation is determined by the balance of forces. However, the link 52 as soon as it becomes slightly inclined to the vertical will transmit some horizontal rearward force from the bracket 54 to the pins 51, thus tending to elevate the front end 49 of the mechanism 14 causing the latter to exert some upward pressure on the box chassis 11; but far less than in the situation depicted in FIG. 10, by virtue of the lost motion effect of the links 52. For this reason the linkage arrangement of FIG. 14 is less preferred than the slot arrangements of FIGS. 1 to 13 or the slider arrangement of FIG. 15.

FIG. 15 shows an alternative embodiment in which the lost motion effect is achieved by connecting each transverse end of the free end 21c by a pin 55 to a slider 56 mounted to slide along a rod 57 that is firmly mounted between bracket members 58 secured to the underside of the box chassis 11. This arrangement again permits the pins 55 to travel in the arc C while the rod 57 travels in the arc D. In the embodiment shown in FIG. 15, the pins 55 are located slightly forwardly of the pins 28, so that the downward forces will tend to have a counterclockwise (i.e. depressing) action on the hoist mechanism as a whole. In the event that the construction is such that it is more convenient to arrange the pins 55 rearwardly of the pins 28, then the rod 57 should preferably be inclined in a manner analogous to the inclination of the slots 45, in order that the force normal to the longitudinal axis of the rod 57 will still pass to the left (forwardly) of the axis of the pins 28.

The location of the lost motion in the connection between the hoist mechanism and the dump box chassis is preferred, because it provides a firm mounting of the hoist mechanism on the vehicle; but nevertheless it is possible to provide essentially the same lost motion effect with essentially the same advantages in the avoidance of interference, by locating the lost motion mechanisms in the pivotal connections between the hoist mechanism and the vehicle chassis, i.e. at the pins 28. The entire hoist mechanism would then be subject to some front to rear displacement during the initial stages of elevation. The invention in its broad scope thus includes this alternative.

Similarly, while in the embodiment of FIGS. 1 to 8, the slots 45 have been shown mounted on the chassis and the cooperating members (rollers 43) which engage them are located on the hoist mechanism, this orientation can be reversed, if desired, to locate the slots on the hoist mechanism and the cooperating members on the chassis. This alternative is thus also within the scope of the invention.

I claim:

1. A hoist mechanism for mounting in a confined space between a vehicle chassis having an upper surface defining a first horizontal plane and a dump box chassis overlying said vehicle chassis and being connected thereto about a first axis to be pivotable in a first arc between a lowered position defining a second horizontal plane and a tilted, raised position; said mechanism comprising a. an elongate lower member and an elongate upper member overlying the lower member in a generally parallel and nesting orientation thereto for enabling mounting of said members in said confined space,
   b. means pivotally interconnecting first ends of said members to define a second axis,
   c. first connecting means for pivotally connecting a second end of said lower member to the vehicle chassis to rotate about a third axis remote from said second axis,
   d. second connecting means for pivotally connecting a second end of said upper member to the dump box chassis to rotate about a fourth axis remote from the second axis and generally overlying the third axis,
   e. and fluid-pressure-operated means extending between said members for rotating said upper member relative to the lower member so that said second end of the upper member travels in a second arc described about said second axis,
   f. wherein one of said connecting means (c) and (d) includes lost motion means enabling generally horizontal relative movement for a limited distance between a selected one of said chassises and the second member end connected to such selected chassis by said one connecting means, to enable said upper member to move in said second arc during initial upward rotation of said dump box chassis notwithstanding rotation of the latter in said first arc,
   g. wherein said lost motion means comprise a first part in the form of at least one slot extending generally in the horizontal direction and a second part in the form of a member cooperating with each said slot, one of said parts being mounted on said selected chassis and the other of said parts being mounted on the second member end whereby to provide both a horizontal lost motion effect and a pivotal connection.

2. A hoist mechanism according to claim 1, wherein said selected chassis is the dump box chassis.

3. A hoist mechanism according to claim 2, wherein said slot is so inclined that a generally downward force exerted by said slot on its cooperating member extends on the side of said third axis towards said second axis.

4. A hoist mechanism according to claim 1, wherein each of said members has a main portion extending horizontally between the chassises above said first plane and a depending end portion extending below said first plane, and wherein said second axis extends through said depending end portions.

5. A hoist mechanism according to claim 4, wherein the fluid-pressure-operated means extend between a location on the lower member in the vicinity of said third axis and a location on the upper member above said second axis and substantially spaced therefrom.

6. A hoist mechanism for mounting in a confined space between a vehicle chassis having an upper surface defining a horizontal plane and a dump box chassis overlying said vehicle chassis and pivotally connected thereto; said mechanism comprising
   a. elongate, upper and lower members having main portions extending horizontally in said confined space above said plane and depending end portions projecting below said plane,
   b. means pivotally interconnecting said depending end portions about a first axis,
   c. means pivotally connecting an end of the main portion of the lower member remote from its depending end portion to the vehicle chassis about a second axis,
   d. means connecting an end of the main portion of the upper member remote from its depending end portion to the dump box chassis,
   e. and fluid-pressure-operated means extending between said members for effecting rotation of the upper member about said first axis,
   f. said connecting means (d) comprising at least one generally horizontal slot located in the dump box chassis and a member cooperating with said slot mounted on said remote end of the upper member whereby to provide both a horizontal lost motion and a pivotal connection between the dump box chassis and the upper member.

7. A hoist mechanism according to claim 6, wherein said slot is so inclined that a generally downward force exerted by said slot on the cooperating member extends on the side of said second axis towards said depending end portions.

8. In a vehicle having a main vehicle chassis and a dump box chassis pivotally connected thereto, a hoist mechanism mounted between and pivotally connected to said chassises, said mechanism comprising
   a. elongate, upper and lower members having main portions extending horizontally between said chassises and depending end portions projecting below a plane defined by an upper surface of the vehicle chassis,
   b. pin means pivotally interconnecting said depending end portions,
   c. fluid-pressure-operated means extending between said members for effecting rotation of the upper member about said pin means and consequent elevation of the dump box chassis,
   d. said pivotal connection of the hoist mechanism to the chassises including lost motion mean for enabling said upper member to rotate solely about said pin means during initial upward rotation of the dump box chassis on the vehicle chassis,
   e. wherein said lost motion means comprise at least one generally horizontal slot located in the dump box chassis and a member cooperating with said slot mounted on the upper member of the hoist mechanism.

9. In a vehicle having a main vehicle chassis and a dump box chassis pivotally connected thereto, a hoist mechanism mounted between and pivotally connected to said chassises, said mechanism comprising
   a. elongate, upper and lower members having main portions extending horizontally between said chassises and depending end portions projecting below a plane defined by an upper surface of the vehicle chassis,
   b. pin means pivotally interconnecting said depending end portions,
   c. fluid-pressure-operated means extending between said members for effecting rotation of the upper member about said pin means and consequent elevation of the dump box chassis,
   d. said pivotal connection of the hoist mechanism to the chassises including lost motion means for enabling said upper member to rotate solely about said pin means during initial upward rotation of the dump box chassis on the vehicle chassis,
   e. wherein said depending end portions are arranged to extend below the level of a drive shaft extending along said vehicle chassis while straddling said shaft.

* * * * *